(12) United States Patent
Gazda et al.

(10) Patent No.: US 11,379,197 B2
(45) Date of Patent: Jul. 5, 2022

(54) COMPILING ON INTERCONNECTED QUBIT SUBSYSTEMS

(71) Applicant: BULL SAS, Les Clayes sous Bois (FR)

(72) Inventors: Arnaud Gazda, Versailles (FR); Simon Martiel, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 17/198,732

(22) Filed: Mar. 11, 2021

(65) Prior Publication Data

US 2021/0286599 A1 Sep. 16, 2021

(30) Foreign Application Priority Data

Mar. 13, 2020 (EP) .................................... 20305262

(51) Int. Cl.
*G06F 8/41* (2018.01)
*G06N 10/00* (2022.01)
*G06F 8/30* (2018.01)

(52) U.S. Cl.
CPC ................ *G06F 8/41* (2013.01); *G06F 8/314* (2013.01); *G06N 10/00* (2019.01)

(58) Field of Classification Search
None
See application file for complete search history.

(56) References Cited

U.S. PATENT DOCUMENTS

| 9,663,358 | B1 * | 5/2017 | Cory ......................... G06F 7/38 |
| 2018/0248566 | A1 * | 8/2018 | Hastings ............... H03M 13/19 |
| 2019/0156242 | A1 * | 5/2019 | Haener ................. H04L 9/0852 |
| 2019/0164076 | A1 | 5/2019 | Kim |
| 2020/0394544 | A1 * | 12/2020 | Low ........................ G06N 10/00 |
| 2021/0405398 | A1 * | 12/2021 | Kolmakov .............. G02F 1/025 |

FOREIGN PATENT DOCUMENTS

EP 3674998 A 7/2020

OTHER PUBLICATIONS

Bermudez, et al., "Fault-tolerant protection of near-term trapped-ion topological qubits under realistic noise sources", Phys. Rev. A 100, 062307, Quantum Physics, arXiv:1810.09199, Nov. 4, 2019.

(Continued)

*Primary Examiner* — Philip Wang
(74) *Attorney, Agent, or Firm* — Meagher Emanuel Laks Goldberg & Liao, LLP

(57) ABSTRACT

Examples include quantum computing compiling methods comprising considering a threshold corresponding to a maximum number of qubits available for processing in any one subsystem of a plurality of interconnected qubit subsystems and identifying a total number of qubits submitted to a specific quantum circuit, the total number of qubits exceeding the threshold. The methods comprise compiling a first section of the specific quantum circuit on a first subsystem by successively selecting quantum gates. If a selected quantum gate is to be applied to qubits assigned to different subsystems, the passing of a qubit from the first subsystem to a second subsystem through a junction connecting the first subsystem to the second subsystem is coded, and the second section of the specific quantum circuit is compiled on the second subsystem.

20 Claims, 13 Drawing Sheets

(56) References Cited

OTHER PUBLICATIONS

Gutieérrez et I., "Transversality and lattice surgery: Exploring realistic routes toward coupled logical qubits with trapped-ion quantum processors", Phys. Rev. A 99, 022330, Feb. 25, 2019.
Bermudez et al., "Assessing the Progress of Trapped-Ion Processors Towards Fault-Tolerant Quantum Computation", Phys. Rev. X 7, 041061, Dec. 13, 2017.
Kaufmann et al., "Fast ion swapping for quantum information processing", https://arxiv.org/pdf/1607.03734.pdf, Jul. 13, 2016.
Brandl et al., "Cryogenic setup for trapped ion quantum computing", https://arxiv.org/pdf/1607.04980.pdf, Jul. 18, 2016.
Takada et al., "Sound-driven single-electron transfer in a tunable beam-splitter setup", Nature Communications 10, 4557 (2019).
European Search Report for corresponding EP Application No. 20305262.6, dated Aug. 27, 2020.
Tzetan S. Metodi et al, Scheduling Physical Operations in a Quantum Information Processor, SPIE, PO Box 10 Bellingham WA 98227-0010 USA, vol. 6244, pp. 62440T-1-62440T-12, Mar. 29, 2006 (Mar. 29, 2006).
Sahar Sargaran et al., "SAQIP: A scalable architecture for quantum information processors", ACM Transactions On Architecture and Code Optimization, Association for Computing Machinery, 2 Penn Plaza. Suite 701 New York NY 10121-0701 USA, vol. 16, No. 2, Article 12, pp. 12:1-12:21, Apr. 18, 2019 (Apr. 18, 2019).
Pino J M et al., "Demonstration of the QCCD trapped-ion quantum computer architecture", Arxiv.org. Cornell University Library, 201 Olin Library Cornell University Ithaca, NY 14853, pp. 1-8, Mar. 3, 2020 (Mar. 3, 2020).
Stevens Kelly E et al., "Automating quantum experiment control", Arxiv, Org. Kluwer Academic, Dordrecht NL, Quantum Inf Process, vol. 16, No. 3, pp. 1-20, Jan. 21, 2017 (Jan. 21, 2017).
Kaushal Vidyut et al., "Shuttling-Based Trapped-Ion Quantum Information Processing", pp. 1-23, Dec. 10, 2019 (Dec. 10, 2019).

* cited by examiner

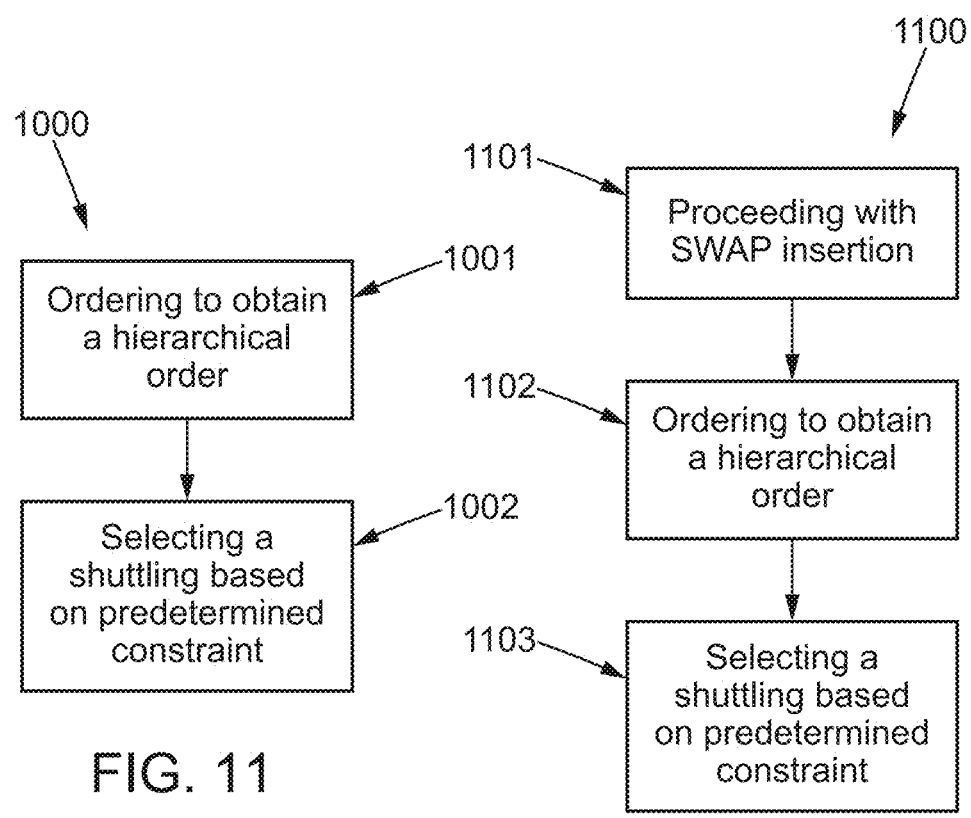
FIG. 11
FIG. 12
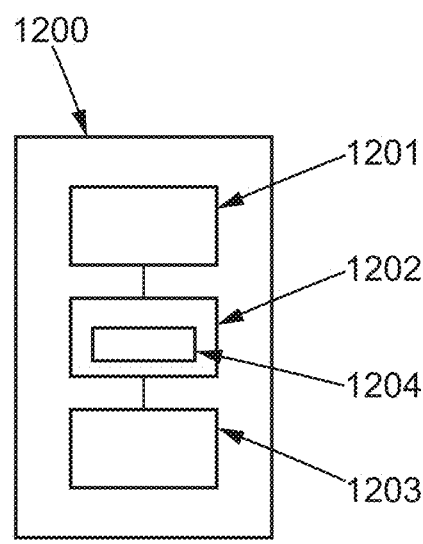
FIG. 13

COMPILING ON INTERCONNECTED QUBIT SUBSYSTEMS

BACKGROUND

While compiling a computer program may generally permit translating a computer program from a source language to a destination language, in some instances compiling permits translating a high level language such as a language understood for example by computer programmers into a lower level language which may be directly executed by a computer.

Computer program compiling has been well studied for classical computers for many years. The known computing methods however may not apply in the context of quantum computing.

SUMMARY

The invention is defined by the appended independent claims. Additional features and advantages of the concepts herein disclosed are set forth in the description which follows.

The present disclosure describes a quantum computing compiling method comprising:
  considering a threshold corresponding to a maximum number of qubits available for processing in any one subsystem of a plurality of interconnected qubit subsystems;
  identifying a total number of qubits submitted to a specific quantum circuit, whereby the total number of qubits exceeds the threshold;
  compiling a first section of the specific quantum circuit on a first subsystem of the plurality by successively selecting quantum gates from the specific quantum circuit;
  if a selected quantum gate is to be applied to qubits assigned to different subsystems, coding the passing of a qubit from the first subsystem to a second subsystem of the plurality through a junction connecting the first subsystem to the second subsystem; and
  compiling the second section of the specific quantum circuit on the second subsystem.

In some examples, the quantum compiling method further comprises, prior to the identifying, proceeding with SWAP insertion on a source quantum circuit in order to obtain the specific quantum circuit.

In some examples, the quantum compiling method further comprises compiling one or more additional sections of the specific quantum circuit on one or more additional subsystems of the plurality, the one or more additional subsystems being connected to the first subsystem directly or indirectly.

In some examples, the one or more additional subsystems are connected to the first subsystem directly or indirectly through one or more additional junctions; whereby the method further comprises coding the passing of a qubit through the one or more additional junctions in order to compile the one or more additional sections.

In some examples, each subsystem comprises locations, whereby each location permits:
  swapping qubits if the location holds two qubits; and
  moving all qubits present at the location to a neighbor empty location.

In some examples, each subsystem of the plurality comprises a specialized location, whereby:
  two single qubits may be joined into the specialized location from neighboring locations if the specialized location is empty;
  qubits may be split from the specialized location towards neighboring empty locations; and
  qubits located at the specialized location may all be submitted to a quantum gate.

In some examples, the specific location is a laser interaction zone, LIZ.

In some examples the specific location comprises 2 qubits, whereby the 2 qubits are submitted to more than one quantum gate successively at the specific location.

In some examples each subsystem comprises locations, whereby each location may either be empty, comprise one qubit, or comprise 2 qubits.

In some examples each junction between N subsystems comprises N locations, whereby each subsystem of the N subsystems comprises one of the N locations, whereby N is a natural integer greater than 1.

In some examples each one of the N locations has a single neighbor location on a same subsystem.

In some examples, coding the passing of a qubit through a junction comprises coding the passing of the qubit from a source location of the junction comprised on a source subsystem to a destination location on a destination subsystem, whereby the destination location is empty prior to passing the qubit, and whereby the source and destination subsystems are comprised in the plurality of interconnected qubit subsystems.

In some examples, the method further comprises coding a parallel processing of different sections on different subsystems of the plurality prior to the passing of a qubit through a junction.

The present disclosure also describes a computer system comprising a processor configured to perform any one of the methods hereby disclosed.

The present disclosure also describes a computer-readable storage medium comprising instructions which, when executed by a computer, cause the computer to carry out any one of the methods hereby disclosed.

BRIEF DESCRIPTION OF THE DRAWINGS

FIG. 11 is an example representation of compiling a section.

FIG. 12 is an example representation of compiling a section.

FIG. 13 is an example representation of an example computer system as per this disclosure.

DETAILED DESCRIPTION

This disclosure relates to quantum computing. Quantum computing is a non-classical computing technology relying on the use of qubits as unit of memory. More specifically, this disclosure relates to a compiling method for quantum computing. Compiling permits translating a first representation of a computer program into a second representation. In this disclosure, compiling permits translating a higher level representation such as a quantum circuit comprising quantum gates to be applied qubits into a lower level representation. A higher level representation should be understood as being more likely to be directly understood by a human being, while a lower level representation should be understood as being more suitable for implementation onto a computing system, in this case a quantum computer. An example of such a quantum computing system is a trapped ion quantum computing system. An example of a low level representation for a trapped ion quantum computing system would describe the movement of specific ions within the trapped ion system. Such a description of movement at the system level is called a shuttling schedule. Example low level representations should take limitations of a system into account. In particular, example low level representations should take hardware limitations of a system into account. The methods according to this disclosure may also for example be applied to quantum systems based on quantum dots, whereby qubits may be physically displaced from a circuit to another, or be displaced within a same register from a location to another.

Figure 1A:
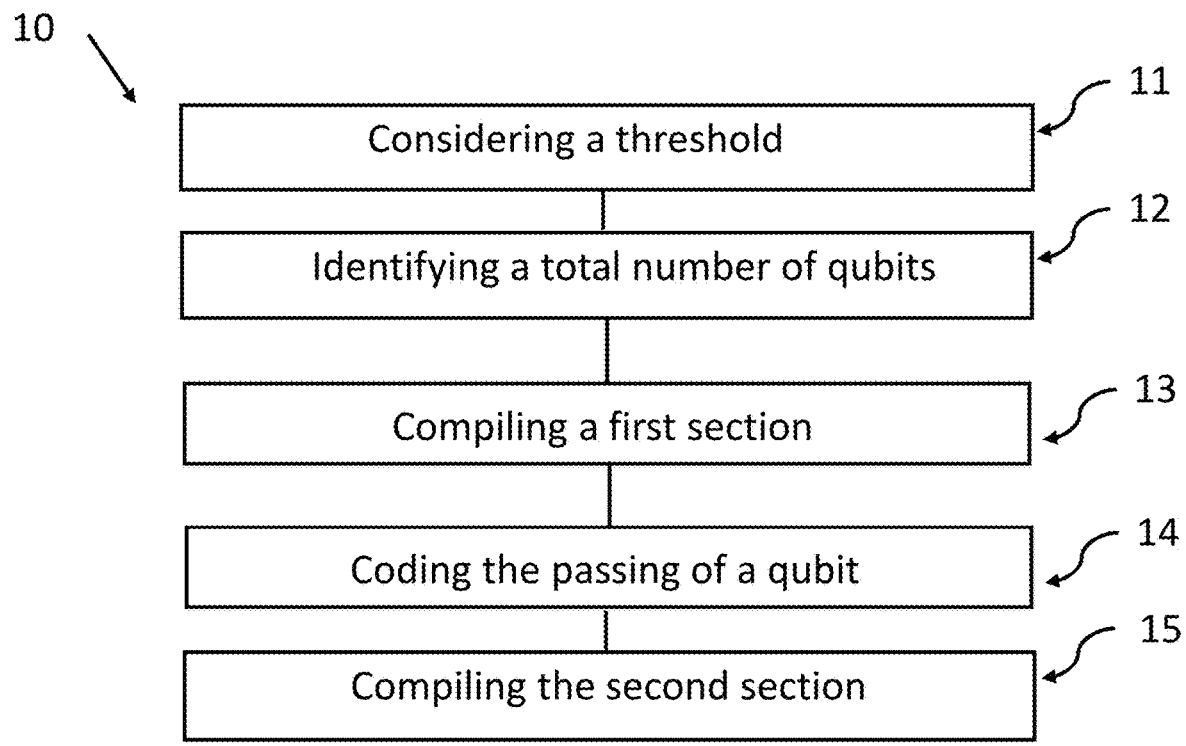
FIG. 1A illustrates an example method.

FIG. 1A illustrates an example method 10 according to this disclosure. As illustrated in block 11, example method 10 comprises considering a threshold corresponding to a maximum number of qubits available for processing in any one subsystem of a plurality of interconnected qubit subsystems.

A subsystem of a plurality of interconnected qubit subsystems according to this disclosure should be understood as a quantum subsystem comprising a plurality of qubits and a plurality of locations, whereby each qubit may move from one location of a subsystem to a neighbor location of the same subsystem when submitted to a first physical phenomenon, subsystems being interconnected whereby a qubit may move from a location in one of the connected subsystems to another location in another of the connected subsystems when submitted to a second physical phenomenon. In some examples, the first phenomenon and the second phenomenon are of the same nature but the second phenomenon corresponds to a second energy level applied to a qubit for a passing from a first to a second subsystem through a junction, the second energy level being at least double of a first energy level corresponding to the first phenomenon for moving a qubit from one location to another neighbor location in a same subsystem. In some examples, the first phenomenon and the second phenomenon are of the same nature but the second phenomenon corresponds to a second energy level applied to a qubit for a passing from a first to a second subsystem through a junction, the second energy level being at least triple of a first energy level corresponding to the first phenomenon for moving a qubit from one location to another neighbor location in a same subsystem. In an example, the subsystems are Paul traps, the first phenomenon and the second phenomenon being the application of an electrical field or electrical voltage to one or more ions corresponding to one or more qubits, the first phenomenon corresponding for example to the application of a pseudopotential or energy level of less than 0.7 meV (mili electron volt, 1 meV being about $1,602177 \times 10^{-22}$ Joule) and the second phenomenon corresponding for example to a pseudopotential or energy level of more than 0.14 meV. In some examples, the second phenomenon is differing from the first physical phenomenon. In some examples, the first phenomenon is of an electrical nature and the second phenomenon is a surface acoustic wave. In some examples, qubits move from a location to another in a given subsystem by application of an electrical field, and qubits move from a first subsystem to a second subsystem through a junction by application of surface acoustic waves.

While a single subsystem, taken on its own, may permit qubit movement within the subsystem of a limited number of qubits and permit executing, after compilation, a quantum computer program on such a single subsystem using some or all of the limited number of qubits, some such single subsystems may not permit executing other quantum computer programs requiring a number of qubits higher than the limited number of qubits available on such a single subsystem. In such cases, a solution is to run the program on another subsystem having a higher number of qubits. The current state of quantum computing is however such that any single subsystem offers a limited number of qubits, thereby limiting the possibility to run complex quantum computing programs. The example methods according to this disclosure relate to a plurality of such subsystems, whereby such subsystems are interconnected, whereby each one of such interconnected subsystems may move at least one qubit to at least another one of such subsystems. While moving a qubit within a subsystem takes place using a subsystem mechanism, moving a qubit from one interconnected subsystem to another interconnected subsystem takes place using another mechanism differing from the subsystem mechanism, whereby the subsystems, while being interconnected, are separated from each other, such separation between interconnected subsystems requiring vanquishing a certain barrier between interconnected subsystems which is higher than a barrier between different locations of a given subsystem. Using interconnected subsystems according to this disclosure thereby permits executing quantum computer programs which otherwise may not be executable using a single subsystem, for example because the single subsystem would not offer a sufficient number of qubits. The example methods according to this disclosure permit compiling a quantum computer program in order to prepare an execution of such a program using interconnected subsystems.

The threshold corresponding to a maximum number of qubits available for processing in any one subsystem of a plurality of interconnected qubit subsystems corresponds to a threshold at or below which a quantum computer program requiring for its execution a number of different qubits equal or lower than the threshold may be executed using a subsystem holding such maximum number of qubits, and thereby not requiring executing the quantum computer program using different interconnected subsystems as per this disclosure. One should note that is a quantum computer program may be executed on different subsystem without exchange of qubits between the subsystems, such a quantum computer program is considered as several independent quantum computer programs according to this disclosure. In other words, the example methods according to this disclosure apply to compiling a quantum computer program which comprises quantum gates applied to qubits, whereby each quantum gate of the program applies to at least one qubit which was submitted to at least another quantum gate of the program.

Indeed, the example method 10 comprises as illustrated in block 12 identifying a total number of qubits submitted to a specific quantum circuit, whereby the total number of qubits exceeds the threshold. Such a specific quantum circuit would then not be executable on a single subsystem comprising a maximum number of qubits equal of lower to the threshold. The threshold is a positive natural integer having a value of 2 or more. In cases of quantum circuits for which a relatively large number of qubits is to be submitted, the number of qubits submitted to the specific quantum circuit should be equal to or lower than a total number of qubits available for processing in all of the subsystems of the plurality of interconnected subsystems, in order to be processed or executed using the subsystems of the plurality of interconnected subsystems. In some cases, a specific quantum circuit may be compiled on a selection or subset of interconnected subsystems of the plurality of interconnected subsystems, particularly if the total number of qubits submitted to the specific quantum circuit is above the threshold but does not require as many qubits as offered using all interconnected subsystems of the plurality. The interconnected subsystems of the plurality may each hold a same number of qubit positions. The interconnected subsystems of the plurality may hold different numbers of qubit positions.

Block 13 of the example method 10 illustrates the compiling of a first section of the specific quantum circuit on a first subsystem of the plurality by successively selecting quantum gates from the specific quantum circuit. The successive selection may follow a reading order of the specific quantum circuit, for example top to bottom or left to right. Due to the fact that the total number of qubits submitted to the specific quantum circuit exceeds the threshold, the first subsystem will not permit compiling the entire specific quantum circuit. The first subsystem may be chosen in a number of different ways. In an example, the first subsystem is a subsystem having the same or more qubits available than any other subsystem of the plurality in order to possibly reduce a total number of subsystems used for the compiling. In an example, the first subsystem is a subsystem having less qubits available than any other subsystem of the plurality, for example to aim at freeing up subsystems having more qubits available for executing another quantum circuit. In an example, the first subsystem is a subsystem having more connections to other subsystems available than any other subsystem of the plurality, for example to aim at facilitating the use of further subsystems of the plurality to complete the compiling. Due to the fact that the number of qubits submitted to the specific quantum circuit exceeds the number of qubits which may be processed on the first subsystem, at some point of the successively selecting quantum gates from the specific quantum circuit a junction quantum gate will be reached which cannot be processed due to such processing of the junction quantum gate involving a qubit which is not available as part of the first subsystem, whereby such junction quantum gate is to be applied to qubits assigned to different subsystems. In some examples, such a junction quantum gate is involving at least two qubits, whereby at least one such qubit is originally located in the first subsystem, and at least one other such qubit is originally located in a second subsystem connected to the first subsystem. The term "originally" in this context should be understood as reflecting a situation prior to the situation illustrated in block 14 of example method 10.

Block 14 of the example method 10 illustrates coding the passing of a qubit from the first subsystem to a second subsystem of the plurality through a junction connecting the first subsystem to the second subsystem if a selected quantum gate is to be applied to qubits assigned to different subsystems. Such coding of the passing of a qubit from the first subsystem to a second subsystem of the plurality takes place through a junction connecting the first and the second subsystems which are thereby directly connected by this junction. The passing of a qubit permits executing a quantum gate such as the junction quantum gate which could not be processed using only qubits available on the first subsystem as a single subsystem. The passing of such qubit will thereby enable compiling the junction quantum gate on the second subsystem, using the qubit passing from the first subsystem to the second subsystem and one or more qubits located on the second subsystem prior to the passing of the qubit from the first subsystem to the second subsystem. The junction connecting the first and the second subsystem permits passing a qubit from the first to the second subsystem. The passing of a qubit from a first to a second subsystem employs a physical mechanism differing from a physical mechanism used to move a qubit from one location of a subsystem to another location of the same subsystem.

Figure 1B:
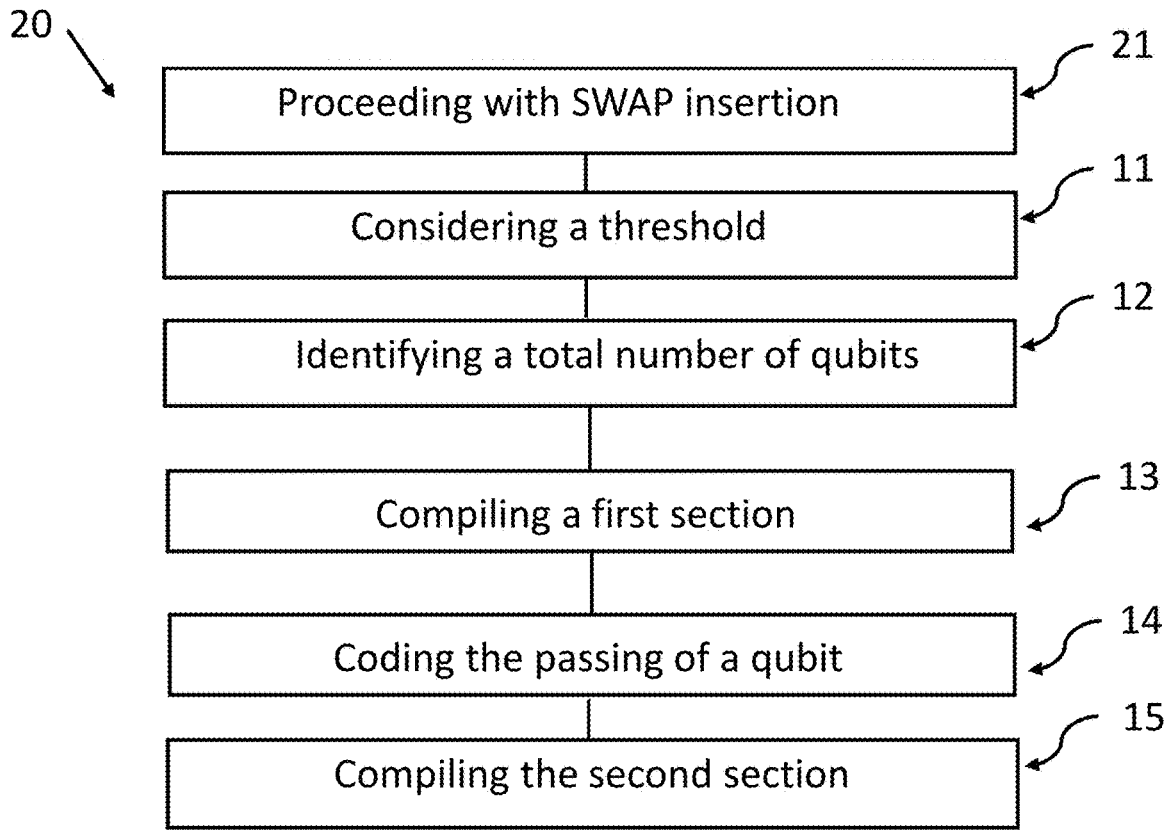
FIG. 1B illustrates another example method.

Another example method 20 according to this disclosure is illustrated in FIG. 1B. This example method comprises blocks 11 to 15 as per example method 10, as well as block 21 illustrating the proceeding with SWAP insertion on a source quantum circuit in order to obtain the specific quantum circuit prior to the identifying. In some examples, the proceeding with SWAP insertion on a source quantum circuit in order to obtain the specific quantum circuit renders the compiling of each section less complex by reducing qubit movements.

Figure 1C:
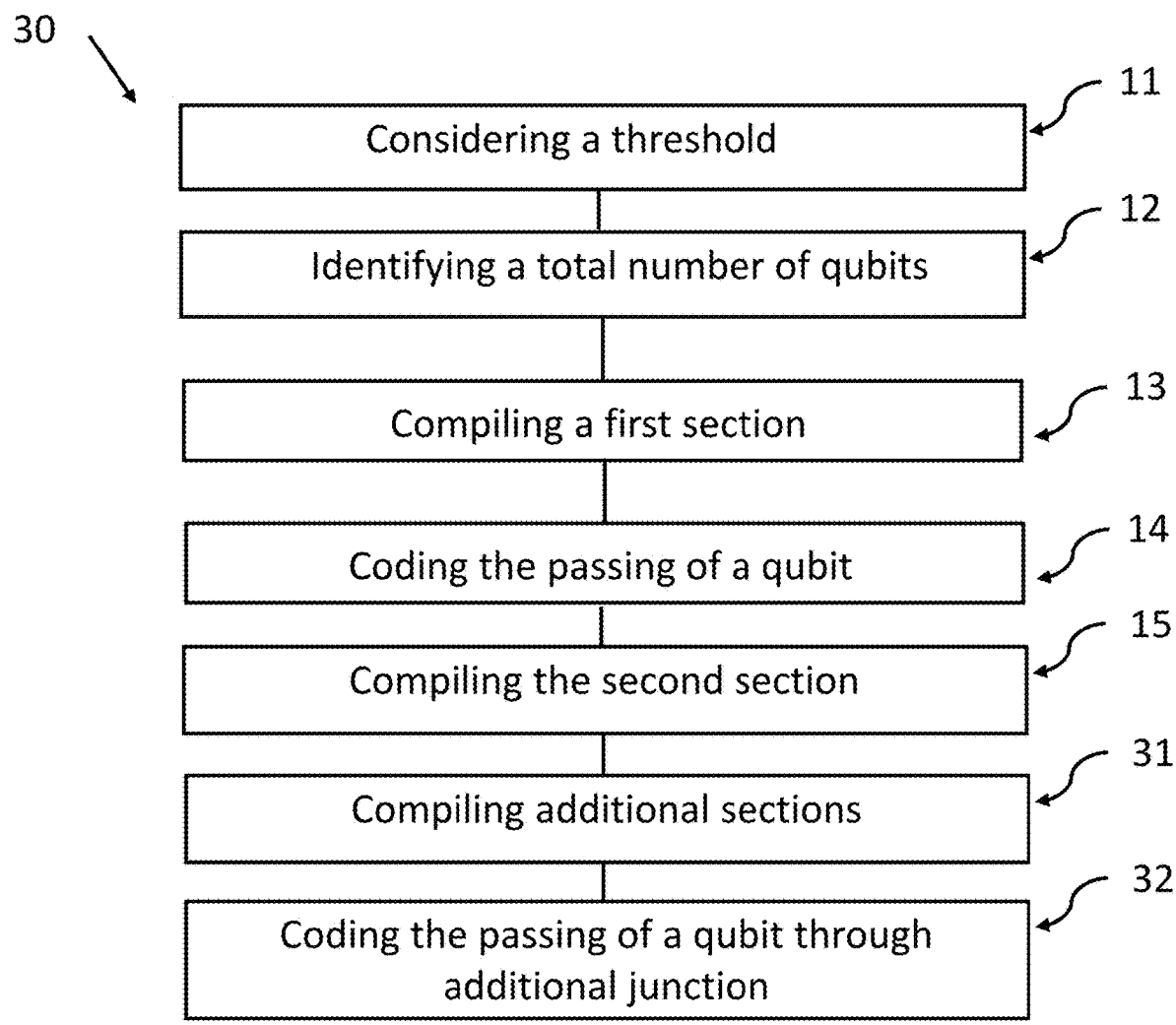
FIG. 1C illustrates a further example method.

Another example method 30 according to this disclosure is illustrated in FIG. 1C. This example method comprises blocks 11 to 15 as per example method 10, as well as block 31 illustrating the compiling one or more additional sections of the specific quantum circuit on one or more additional subsystems of the plurality, the one or more additional subsystems being connected to the first subsystem directly or indirectly. Such one or more additional sections correspond in some examples to additional sections which permit completing the compiling of an entire quantum circuit, whereby each additional section is added when additional qubits are required for executing the entire quantum circuit.

The passing of a qubit from one subsystem to another subsystem takes place each time an additional section of the quantum circuit is compiled.

Example method 30 may in some cases further comprise block 32 whereby the one or more additional subsystems are connected to the first subsystem directly or indirectly through one or more additional junctions; whereby the method further comprises coding the passing of a qubit through the one or more additional junctions in order to compile the one or more additional sections. In other cases, some or all of the one or more additional subsystems may be connected to both of the first and to the second subsystem by the one same junction connecting the first and the second subsystem, for example when such first, second and some or all one or more additional subsystems radiate around the same one junction in a star shape configuration, whereby additional sections may be compiled according to block 31 without coding the passing of a qubit through one or more additional junctions, but possibly passing coding the passing of a qubit through the same one junction from which the subsystems radiate.

Figure 1D:
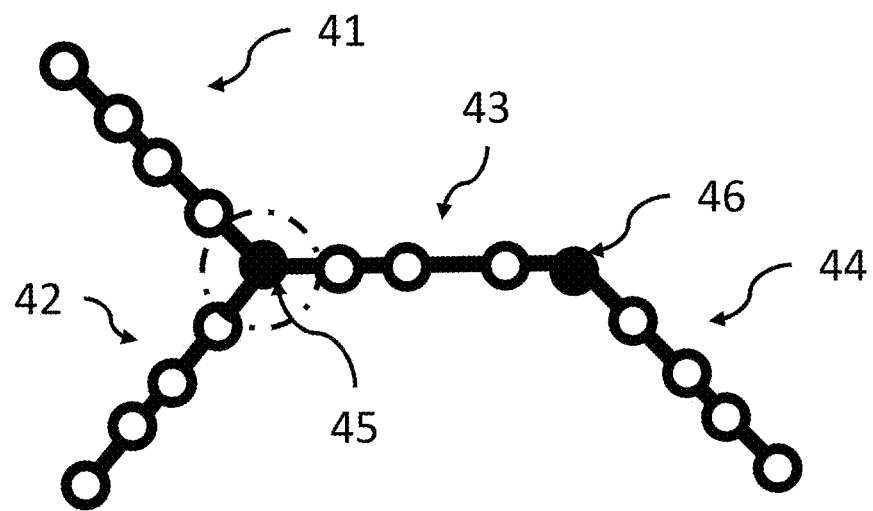
FIG. 1D illustrates an example of a plurality of interconnected qubit subsystems.

FIG. 1D illustrates and example of a plurality of interconnected subsystems 41, 42, 43 and 44, each represented as a segment comprising a number of qubit locations represented as circles. In this example, subsystem 41, 42 and 43 are directly interconnected at junction 45 in a star shape configuration around junction 45. In this example subsystems 43 and 44 are directly interconnected as junction 46, which is a second junction different from junction 45. In this example, subsystems 41 and 42 are indirectly connected to subsystem 44. Subsystems may be directly connected when separated by a single junction. Subsystems may be indirectly connected when separated by more than one junction. In this example, subsystems 41, 42, 43 and 44 each comprise 5 qubit locations. In this example, subsystems 41, Junction 45 is magnified in FIG. 1E. In this example. The junction is between three different subsystems 41, 42 and 43, each subsystem comprising a single location comprised in the junction 45, each location comprised in the junction 45 of each subsystem being represented by a circular location. In the representation according to FIG. 1E, a qubit is represented as a black circle and represented as passing from subsystem 42 to subsystem 43 through junction 45.

In some examples, each junction between N subsystems comprises N locations, whereby each subsystem of the N subsystems comprises one of the N locations, whereby N is a natural integer greater than 1. In the example of junction 45, N=3. In the example of junction 46, N=2. In some examples, each one of the N locations has a single neighbor location on a same subsystem. This is for example the case for subsystems which are linear and do not branch off. In such subsystems, each location has at least one neighbor location and at most two neighbor locations. In some subsystems (not illustrated), a junction may have more than one neighbor location in the same subsystem.

Figure 1E:
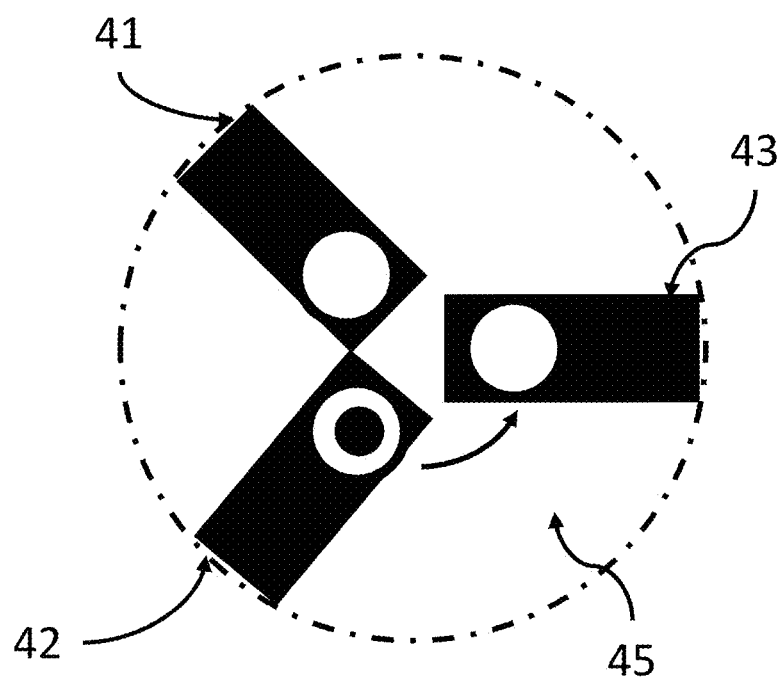
FIG. 1E illustrates the junction of the plurality of interconnected qubit subsystems of FIG. 1D.

In some examples, coding the passing of a qubit through a junction comprises coding the passing of the qubit from a source location of the junction comprised on a source subsystem to a destination location on a destination subsystem, whereby the destination location is empty prior to passing the qubit, and whereby the source and destination subsystems are comprised in the plurality of interconnected qubit subsystems. This is for example the case when coding the passing of the qubit from subsystem 42 to subsystem 43 as illustrated in FIG. 1E. Note that another location comprised in the junction, and being different from the destination location, may be occupied by a qubit.

Figure 1F:
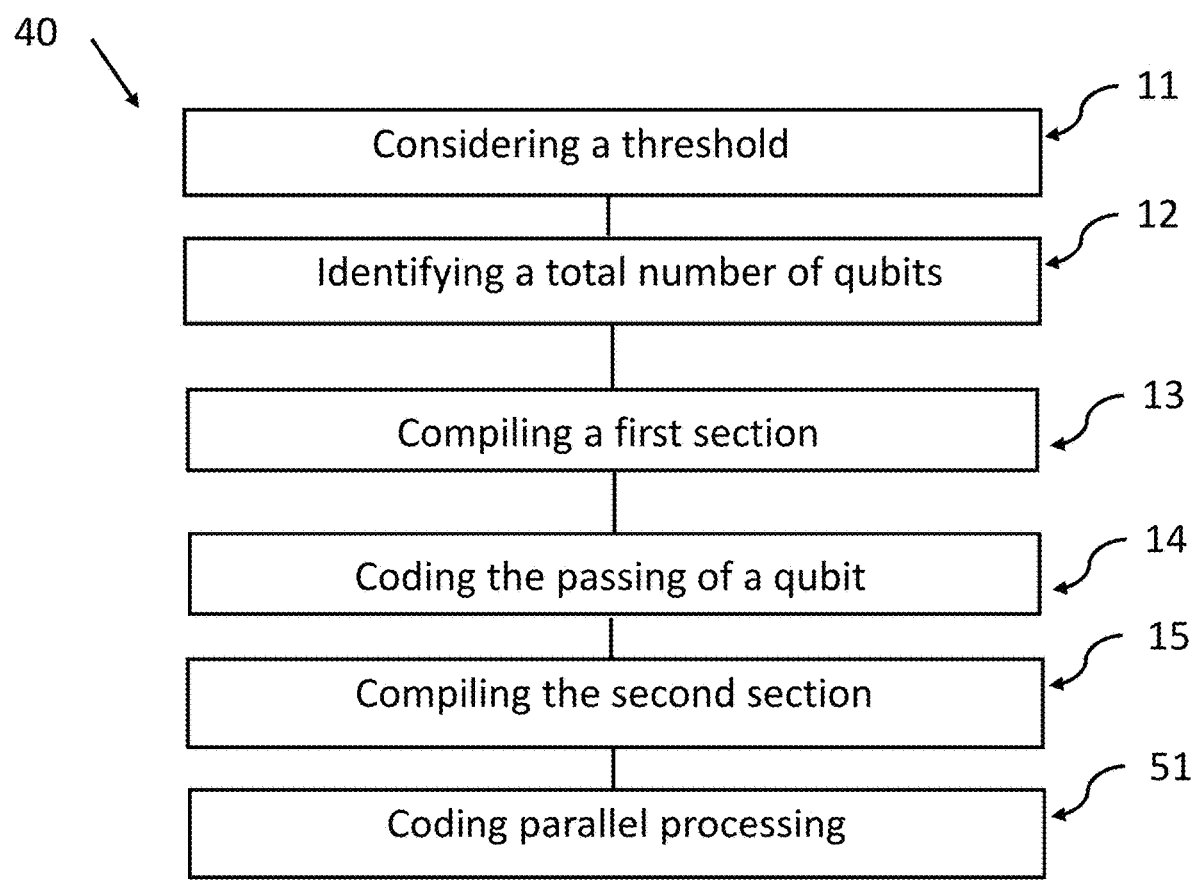
FIG. 1F illustrates yet another example method.

Another example method 40 according to this disclosure is illustrated in FIG. 1F. This example method comprises blocks 11 to 15 as per example method 10, as well as block 51 illustrating coding a parallel processing of different sections on different subsystems of the plurality prior to the passing of a qubit through a junction. In such examples, the quantum compiling method comprises the coding of processing actions which will take place when actually executing the quantum computing program represented by the quantum computing circuit. In such cases, different sections of the quantum computing program may be coded to run in parallel in that some quantum gates would be executed for example on a first subsystem concurrently to some other quantum gates being executed on another subsystem pertaining to the same plurality of interconnected quantum subsystems. Proceeding with parallel processing permits gaining overall processing time until the passing of a qubit from one subsystem to another at a junction is necessary.

Figure 2:
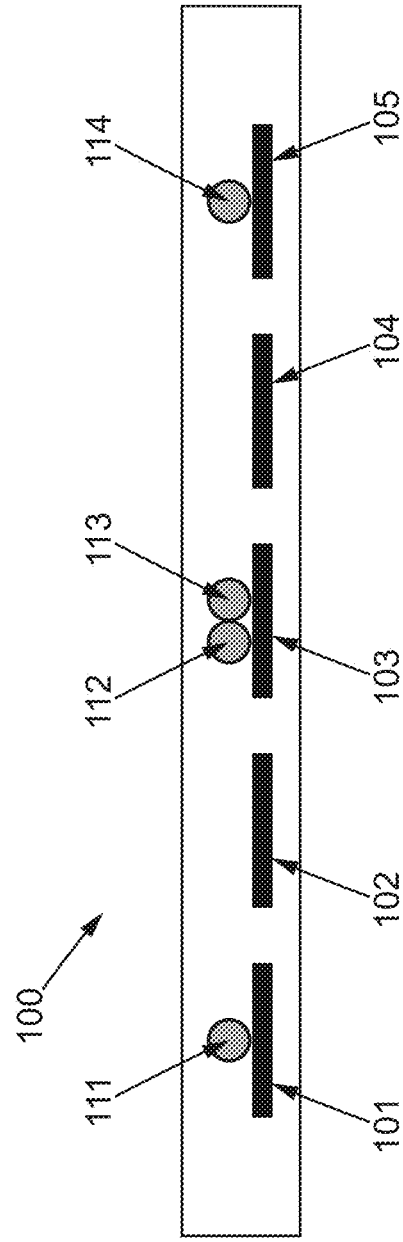
FIG. 2 is an example representation of a subsystem to which the disclosed method as per this disclosure may be applied.

An example trapped ion quantum subsystem 100 is represented in FIG. 2. Such a subsystem may correspond to an example of any one of the subsystems of the plurality. The subsystem 100 of FIG. 2 comprises 5 locations 101-105 and 4 qubits 111-114. The subsystem 100 is represented at a given moment, whereby locations 102 and 104 are empty, location 103 holds 2 qubits being qubits 112 and 113, and locations 101 and 105 each comprise a single qubit, respectively qubit 111 and qubit 114. Each qubit corresponds in this example subsystem to a trapped ion.

The method refers to a quantum circuit. A quantum circuit should be understood as a representation of the application of quantum gates on one or more qubits. Quantum gates are transformations applied to one of more qubits. In other words, quantum gates are basic quantum circuit operation. Example of quantum gates comprise Hadamar gates, SWAP gates, CNOT gates, Controlled-Z gates or Pauli gates.

Figure 3:
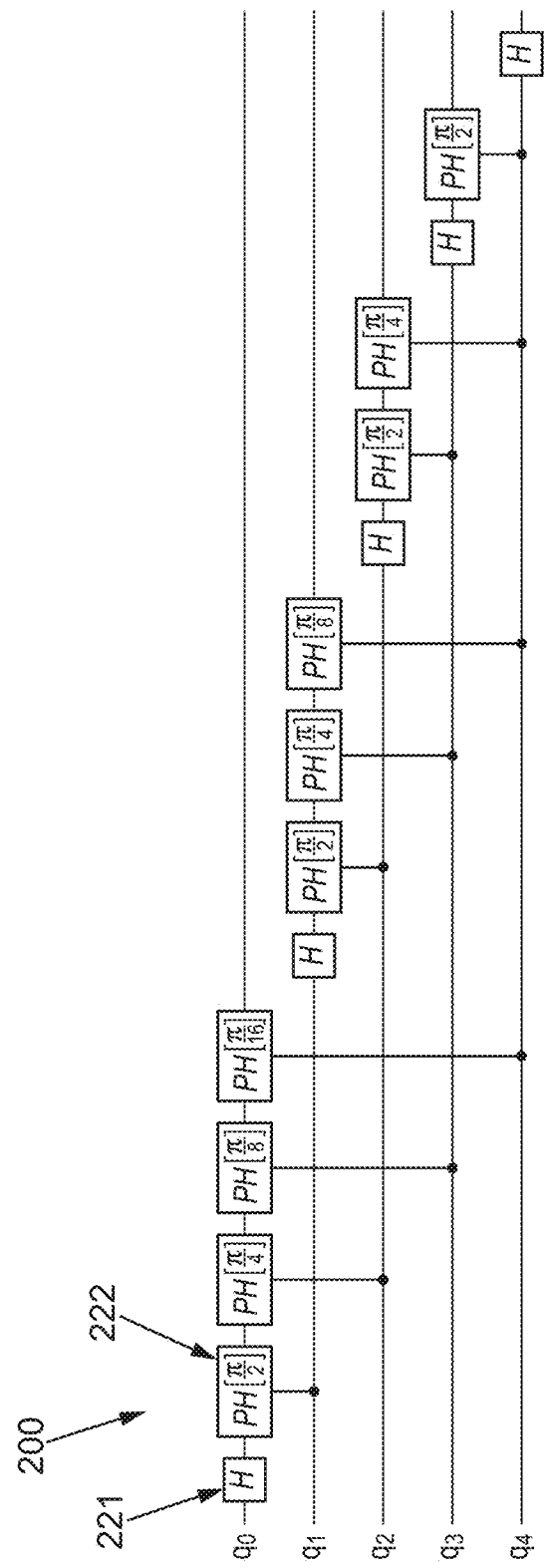
FIG. 3 is an example representation of a quantum circuit to which the disclosed method as per this disclosure may be applied.

In some representations of quantum circuits, qubits are represented along different lines, each line representing one qubit. A quantum gate operating on a qubit is placed onto the line corresponding to the qubit. In some cases, a quantum gate involves more than one qubit, in which case such quantum gate may not only be placed on the line corresponding to one of such qubits, be will also be linked by a segment to another line corresponding to another of such qubit to which the quantum gat will be applied. An example quantum circuit 200 is represented on FIG. 3. Quantum circuit 200 is a representation comprising 5 different qubits q0-q4, each represented by a line, in this case a horizontal line. Each qubit may be represented as being submitted to a quantum gate, time flowing from left to right in FIG. 3. Quantum gates are represented by rectangles placed onto the line corresponding to a qubit to which they are applied. In FIG. 3, the first quantum gate 210 represented on the far left is a Hadamar gate "H" applied to qubit q0. The following gate 222 is a Controlled-Phase gate of angle pi/2gate applying to qubit q0 after application of the first Hadamar gate, and to qubit q1, to which such following gate 222 is also linked, in this case by a vertical segment. It should be noted that quantum gate 222 requires completing quantum gate 221 in order to take place. In other words, quantum gate 222 is dependent on quantum gate 221.

In order to apply a given gate such as gates represented in FIG. 3 to one or more qubits in a subsystem as represented in FIG. 2, such qubits should in such examples be in the same location. In other words, quantum gate 22 may be applied to the qubits 112 and 113 located in location 103. Taking this into account, one realizes that applying to a given quantum computing subsystem a given quantum circuit may be a complex operation, whereby qubits may have to be moved from one location to another a number of times. This is rendered even more complex when additional limitations, such as hardware limitations, exist.

Figure 4:
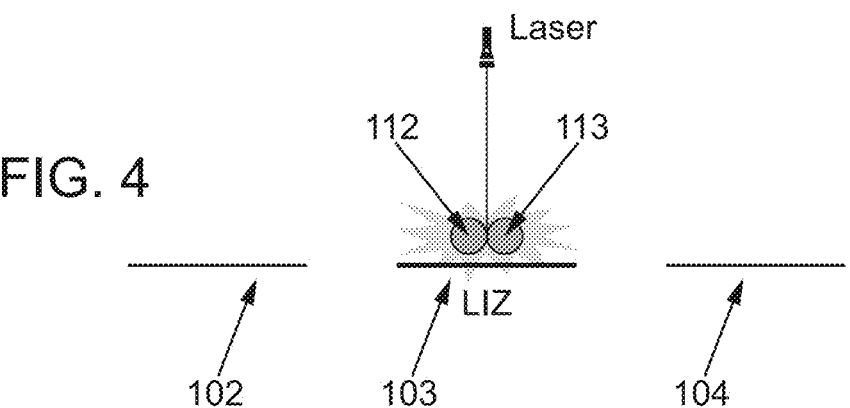
FIG. 4 is an example representation of a subsystem to which the disclosed method as per this disclosure may be applied.
Figure 5:
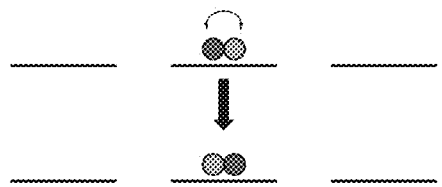
FIG. 5 is an example representation of a subsystem to which the disclosed method as per this disclosure may be applied.
Figure 6:
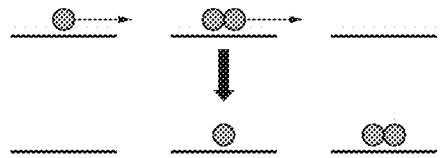
FIG. 6 is an example representation of a subsystem to which the disclosed method as per this disclosure may be applied.
Figure 7:
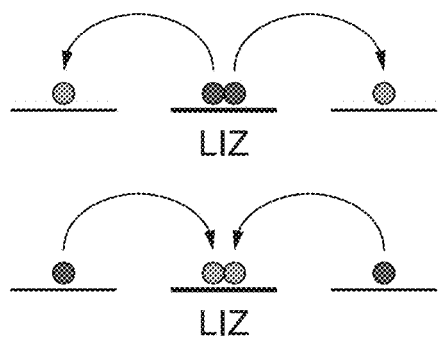
FIG. 7 is an example representation of a subsystem to which the disclosed method as per this disclosure may be applied.

An example of hardware limitation is that in some quantum computing hardware subsystems, only some specific locations may permit executing some specific quantum gates. In an example, a location such as location 103 is a Laser Interaction Zone or LIZ as illustrated in FIG. 4 whereas the other locations 101, 102, 104 and 105 are different locations which do not permit interaction with a laser. As a consequence, in such a subsystem, while any location may permit swapping qubits as illustrated in FIG. 5, or moving all qubits present at one location to a neighbor location as illustrated in FIG. 6, only specific location such as LIZ location may permit splitting two qubits placed in the LIZ or specialized location into two empty neighboring locations, or uniting or joining two single qubits into a LIZ or specialized location from two neighboring locations if the specialized location or LIZ is empty. In other words, in some examples a subsystem may comprise locations, whereby each location permits swapping qubits if the location holds two qubits as per FIG. 5 for example; and/or moving all qubits present at the location to a neighbor empty location as per FIG. 6 for example. In the same or other examples, the subsystem comprises a specialized location, whereby qubits may be joined into the specialized location from neighboring locations if the specialized location is empty as per the bottom part of FIG. 7 for example; whereby qubits may be split from the specialized location towards neighboring empty locations as per the top part of FIG. 7 for example; and whereby qubits located at the specialized location may all be submitted to a quantum gate. Such specific location may be a laser interaction zone, LIZ. In some examples, the specific location comprises 2 qubits, and whereby the 2 qubits are submitted to more than one quantum gate successively at the specific location, for example in order to limit the movement of qubits while proceeding with the execution of a shuttling on a given subsystem.

In some examples, the subsystem comprises locations, whereby each location may either be empty, comprise one qubit, or comprise 2 qubits. In some example, the shuttling comprises locations, whereby none of the locations of the shuttling may comprise at a given moment 3 qubits or more.

Such example limitations render the compiling particularly complex. It is an objective of the method according to this disclosure to solve issues related to such a complex compiling process.

The method according to this disclosure comprises in some examples ordering quantum gates of a nearest neighbor quantum circuit. A nearest neighbor quantum circuit is a quantum circuit for which gates operate on qubits which are nearest neighbors. A nearest neighbor quantum circuit may be provided as such, or may be produced based on a quantum circuit which applies quantum gates to qubits which may not be nearest neighbors. If a quantum circuit is provided in order to proceed with a method according to this disclosure is not a nearest neighbor quantum circuit, the method may in some cases comprise, prior to the ordering, proceeding with SWAP insertion on a source quantum circuit in order to obtain a nearest neighbor quantum circuit. SWAP insertion may for example comprise inserting one or more SWAP quantum gates permitting approximating a qubit to another qubit in order to turn a quantum circuit which comprises quantum gates applied to qubits which are not nearest neighbors into an equivalent nearest neighbor quantum circuit. An equivalent quantum circuit is a quantum circuit which will provide the same final results as a given original quantum circuit. The quantum circuit illustrated in FIG. 3 comprises quantum gates which apply to qubits which are not nearest neighbors. This is assuming that in FIG. 2, q0 has only one nearest neighbor which is q1, q1 has two nearest neighbors being q0 and q2, q2 has two nearest neighbors being q1 and q3, etc. . . . )

Figure 8:
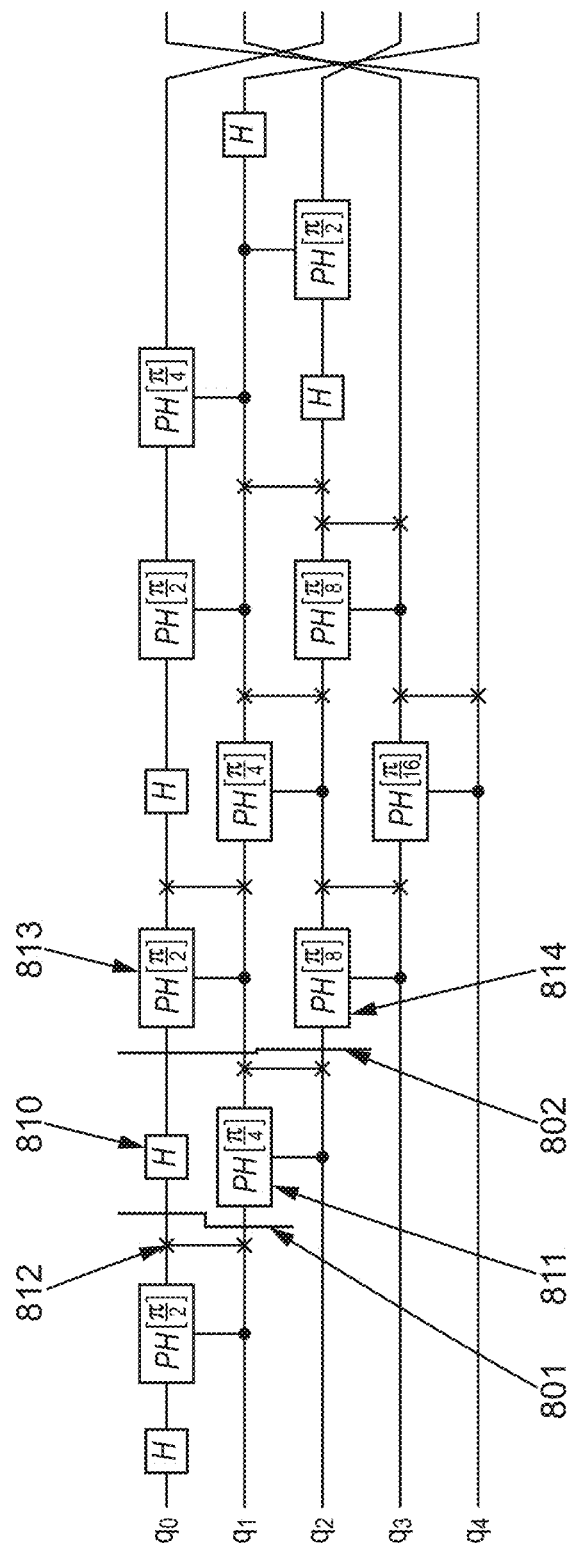
FIG. 8 is an example representation of a quantum circuit to which the disclosed method as per this disclosure may be applied.

An example of nearest neighbor quantum circuit is illustrated in FIG. 8. As illustrated in FIG. 8, the various quantum gates comprised in the quantum circuit are applied to nearest neighbor qubits. In fact, the neighbor quantum circuit is illustrated in FIG. 8 is equivalent to the quantum circuit of FIG. 3, whereby qubits have been swapped to form an equivalent nearest neighbor quantum circuit. Such a quantum circuit may either be compiled on a single quantum subsystem holding a sufficient number of qubits, or be compiled according to the method of this disclosure using various interconnected subsystems and passing at least one qubit through a junction between them.

In the following description, examples of compiling a quantum circuit section on a given subsystem will be explained. Such a quantum circuit section on a given subsystem may take place for example in any one of blocks 12, 15 or 31 of example methods 10, 20 or 30.

Figure 9:
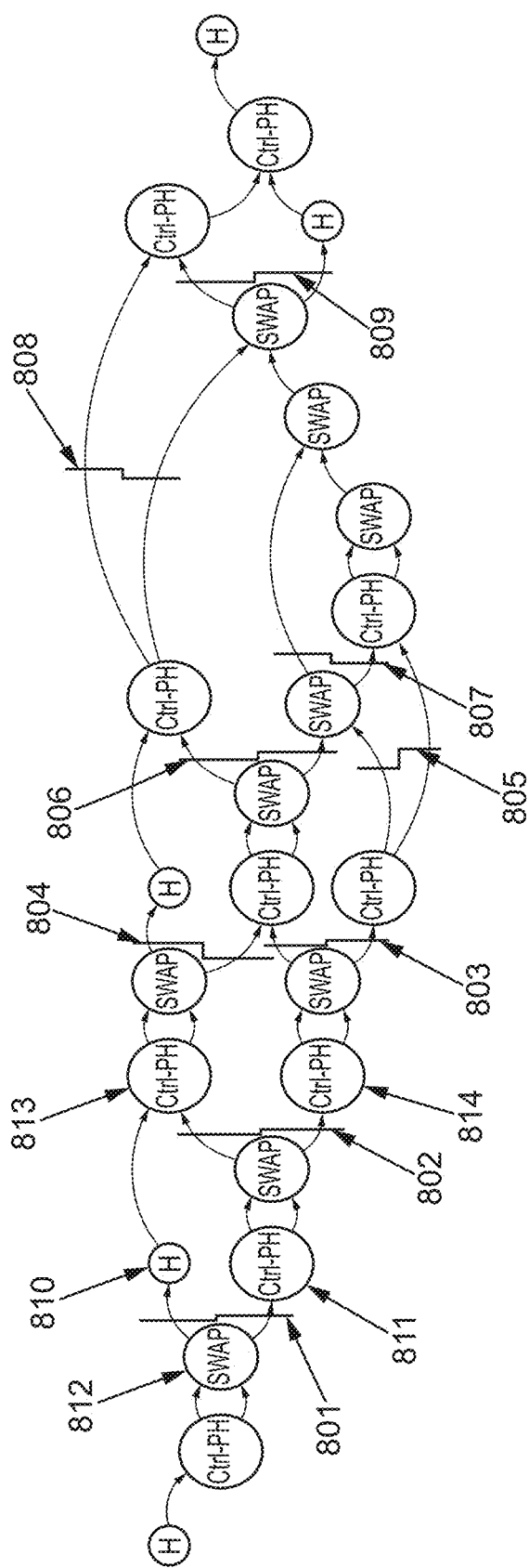
FIG. 9 is an example of a representation of the quantum circuit of FIG. 8.

An example method according to this disclosure comprises, in some examples of compiling a section of a quantum circuit on a subsystem, ordering quantum gates of a nearest neighbor quantum circuit in function of dependencies between the quantum gates. Ordering the quantum gates in function of dependencies implies that for example quantum gate 222 of FIG. 3 would come after quantum gate 221 of FIG. 3, because a given quantum gate which should be applied to a qubit to which a previous quantum gate was applied would be placed after such previous quantum gate. FIG. 9 illustrates an example of a representation of the dependencies between quantum gates based on the nearest neighbor quantum circuit of FIG. 8, in the form of a PERT (Program Evaluation Review Technique) diagram.

An example method according to this disclosure comprises, in some examples of compiling a section of a quantum circuit on a subsystem, ordering quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit. The hierarchical order should be understood as an order to proceed with operating quantum gates when taking dependencies into account. While such a hierarchical order could in very simple cases, form a linear hierarchical order without branching, in most cases the hierarchical order with comprise branching, the branching leading to the possibility to choose between different gates. Such stages in the hierarchical order comprising different choices as to executing a next gate correspond to a front line. Front lines 801-809 comprising multiple respective quantum gates of the nearest quantum circuit are represented in FIG. 9.

Figure 10A:
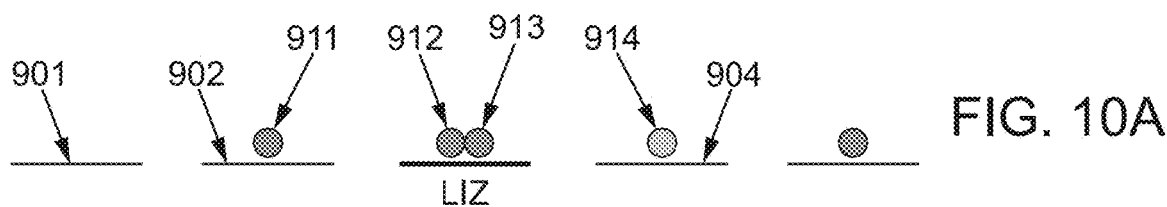
FIGS. 10A-J are example representation of a subsystem to which the disclosed method as per this disclosure may be applied.
Figure 10B:
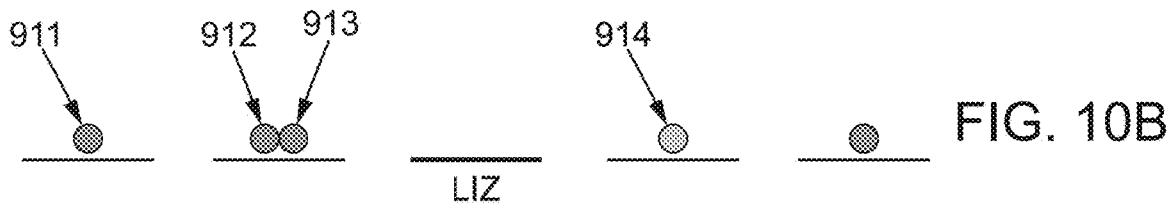
Figure 10C:
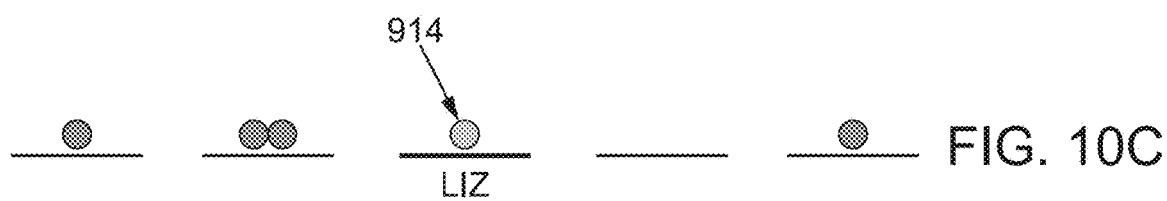

An example method according to this disclosure comprises, in some examples of compiling a section of a quantum circuit on a subsystem, successively selecting, for each front line, and following the hierarchical order, a shuttling for each respective quantum gate of the front line. An example of shuttling is illustrated in FIGS. 10A-C. 10A represents a starting point illustrating the positioning of 5 qubits in a quantum subsystem comprising 5 locations, the central location being, in this example, a LIZ location. In this example, let us assume that the qubit represented by trapped ion 914 located in location 904 should be displaced to the LIZ in order to be submitted to a quantum gate which may only take place in the LIZ location. The shuttling will in this example involve, in a first step, liberating the LIZ by moving qubits 911 from location 902 to location 901 and qubits 912 and 913 from the LIZ location to location 902. This first step will lead to the situation described in FIG. 10B. In a second step, leading to FIG. 10C, the qubit 914 will be moved into the LIZ in order to be submitted to the quantum gate concerned.

Figure 10D:
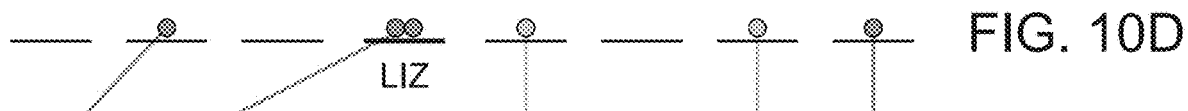
Figure 10E:
Figure 10F:
Figure 10G:

Another example of shuttling is illustrated in Figured 10D to 10G, whereby two qubits which originally were away from the LIZ in FIG. 10D are moved progressively into the LIZ in FIG. 10G. This is done by, from FIG. 10D to FIG. 10E, moving away 2 qubits present in the LIZ, then translating the two qubits which originally were away from the LIZ in FIG. 10D so they surround the empty LIZ in order to, between FIG. 10F and FIG. 10G, join them into the LIZ. In this example, qubits should be isolated as single qubits in opposite neighboring location of the empty LIZ to be brought together into the LIZ. If successive quantum gates may be applied to 2 qubits located in a LIZ, such qubits may be maintained in the LIZ.

Figure 10H:
Figure 10I:
Figure 10J:

A further example of shuttling is illustrated in Figured 10H to 10G, whereby 2 qubits originally together in a LIZ as per FIG. 10H are split away from the LIZ in FIG. 10I, whereby such splitting away takes place after emptying the locations being neighbor to the LIZ, in order to proceed with the split. Indeed, in such examples, a qubit may not be placed in a location which is not an empty location.

As mentioned above, a shuttling may be selected for each respective quantum gate of the front line. Because each front line comprises multiple respective quantum gates, a choice should be made. Indeed, according to the example method hereby described, the shuttling selection is, for each front line, based on a predefined constraint. Such predefined constraint permits selecting in which order of quantum gate shuttling should be built for a given front line. It is indeed an objective of this example method to determine a specific path to build a shuttling corresponding to a quantum circuit section on a quantum subsystem when numerous paths are otherwise available.

In other words, if a user is provided with a quantum circuit section C and with hardware H corresponding to a quantum computing subsystem, numerous shuttling or shuttling schedule possibilities may exist to implement the quantum circuit section using the quantum computing subsystem. If a set $S_C(H)$ of all possible shuttling schedules is defined which are equivalent to circuit section C taking into account the characteristics or limitations of hardware subsystem H, an example resolution of the technical problem may be formulated as solving:

$$\operatorname*{argmax}_{T \in S_C(H)} f(T)$$

where function $f$ is a function from $S_C(H)$ towards $\mathbb{R}$. Finding a shuttling schedule close to a global optimal point may be permitted by this example method.

In some examples, the constraint is a dimensional constraint. Using a dimensional constraint may permit taking dimensional limitations of a quantum computing subsystem into account. Dimensional limitations may for example comprise a maximum number of locations. Different quantum subsystems may have different dimensional constraints.

In some examples, the dimensional constraint applies to a trapped ion quantum computer subsystem. Example of dimensional constraints which may apply to a trapped ion quantum subsystem comprises a limited number of locations and a limited number of qubits.

In some examples, the constraint comprises reducing a number of SWAPs. Reducing a number of SWAPs may permit gaining time when proceeding with the execution of a quantum program. Reducing a number of SWAPs should be understood as reducing the number of time where two qubits located on a same location are swapped.

In some examples, the constraint comprises reducing a total distance covered by qubits. Again in this case, an advantage of reducing such distance may lead to a gain of time when executing a compiled quantum program by way of a shuttling according to the methods hereby disclosed. The total distance may be calculated by cumulatively adding all the movements of all the qubits required to complete the execution of a shuttling. In the example of FIGS. 10A to 10C, the total distance would be the sum of the distance covered by the qubits which are being moved, i.e. qubits 911, 912, 913 and 914. If one would count a move of one qubit from one location to a neighbor location as 1, the distance covered by qubit 914 is 1 (a move from location 904 to the LIZ), the distance covered by qubit 911 is 1 (a move from location 902 to location 901) and each of 912 and 913 would also move of 1 (from the LIZ location to location 902). In FIGS. 10A to 10C, the total distance covered by qubits would thereby be of 4. In this example, applying a SWAP gate as illustrated in FIG. 5 would count 0 (zero) as distance. In other words, applying a SWAP gate would not contribute to a total distance calculation.

In some examples, the constraint comprises reducing a total number of successive states of a shuttling schedule, again aiming at reducing the time taken to execute a shuttling schedule of a quantum circuit section on a subsystem. In the example of FIGS. 10A to 10C, the shuttling schedule comprises 3 states, corresponding to the state of FIG. 10A, the state of FIG. 10B and the state of FIG. 10C. Passing from one state of a shuttling schedule to another may take place in one operation. Operations comprises applying a quantum gate, displacing qubits as a group from one location to a neighbor location in a same direction, even if the qubits pertaining to the group are located on different location (such as qubits 911, 912 and 913 moved as a group between FIG. 10A and FIG. 10B), splitting 2 qubits located together on a specialized location to move them onto neighbor locations in opposite directions as per the top part of FIG. 7, or joining into a same specialized location 2 qubits which were single qubits on opposite neighbor locations of the specialized location as per the bottom part of FIG. 7.

One should note that the predefined constraint may comprise a plurality of sub constraints, for example following a rule or priorities. For example, a constraint may comprise a main priority reducing a number of SWAPS, followed by a second priority of reducing a total distance covered by qubits. Following such a predefined constraint permits selecting which quantum gate may be selected for building a shuttling schedule.

Figure 14:
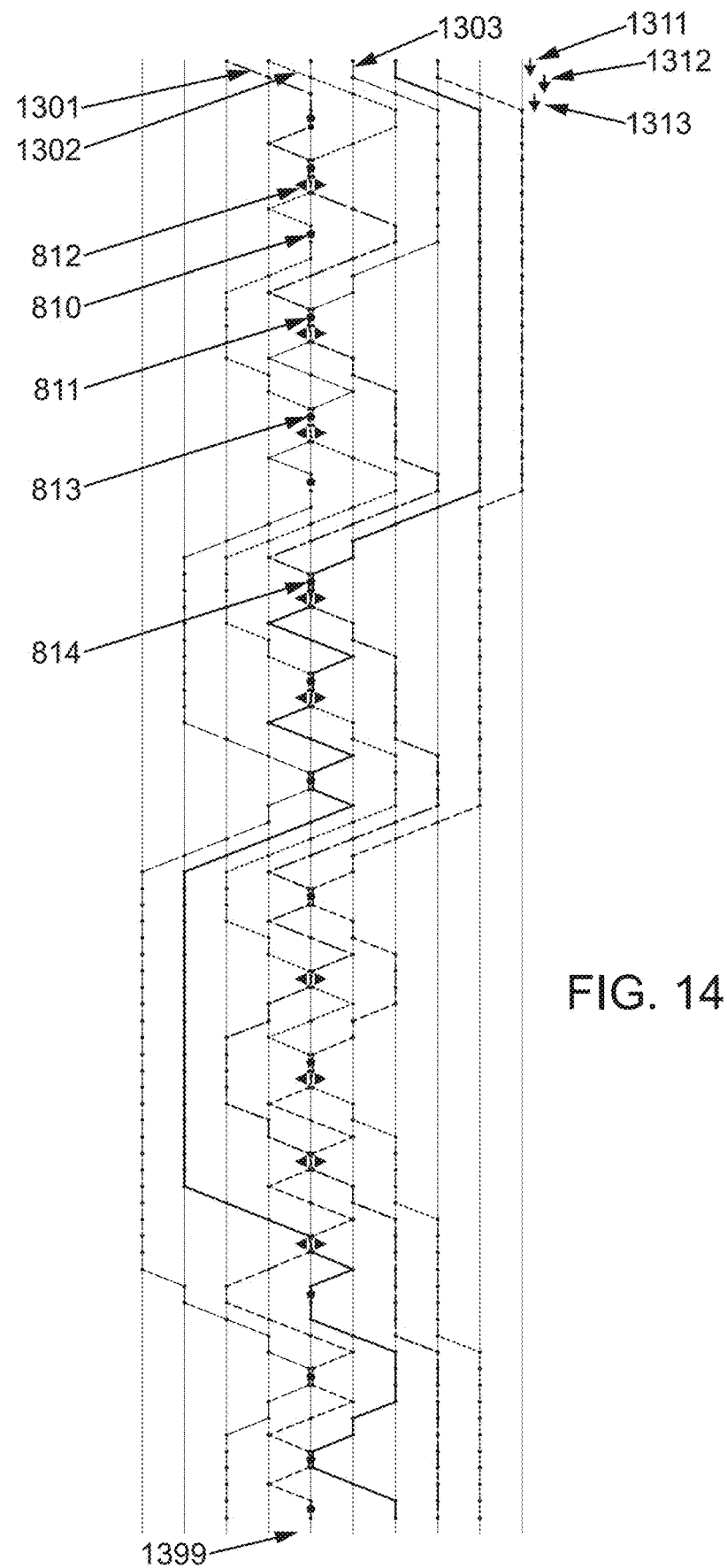
FIG. 14 is an example representation of a shuttling schedule obtained by compiling a section.

In the example PERT diagram illustrated in FIG. 9 (used in this example by a method according to this disclosure to obtain the shuttling schedule illustrated on FIG. 14), the constraint or metric used was to minimize or reduce the total distance. For each front line of the FIG. 9, a choice was made according to this constraint. If for example a first qubit is relatively far from the LIZ compared to a second qubit, moving the first qubit to the LIZ is costly (i.e. it increases the total distance). The method should in this case therefore lead to applying the gate acting on qubits closer to the LIZ (since the constraint or metric is to minimize or reduce the total distance.

In the case of front line 801: This front line 801 placed after applying SWAP gate 812 represented on FIGS. 8, 9 and 14, is used to decide whether the H gate 810 (acting on qubit 1 as per FIG. 8 corresponding to the trajectory 1301 in FIG. 14) or the Ctrl-PH gate 811 (acting on qubits 0 and 2 as per FIG. 8) is applied. Since the qubit 2 (as per FIG. 8, corresponding to the trajectory 1303 in FIG. 14) is far from the LIZ (positioned in FIG. 14 at position 1399) as indicated by the partial shuttling schedule (the schedule represented in FIG. 14 is progressively built, top to bottom, through the methods hereby disclosed—the decision point represented by front line 801 being placed directly below applying the SWAP gate 812 in FIG. 14), applying the Ctrl-PH gate would significantly increase a lot the total distance. The H gate 810 is therefore applied instead to qubit 1 or q0 in FIG. 8. In FIG. 8, read from left to right, the qubit q0 is first submitted to a H gate, then to a Ctrl-PH(PI/2) gate together with q1, then swapped with q1 as illustrated by 812. As illustrated in FIG. 14, read from top to bottom, the resulting shuttling schedule proceeds with gate 810 prior to proceeding with gate 811.

In the case of front line 802, this front line is used to decide whether the phase 1 illustrated by 813 (Ctrl-PH acting on qubits 1 and 2) or the phase 2 illustrated by 814 (Ctrl-PH acting on qubits 0 and 3) is applied. Since no gate has been applied on the qubit 3 when this front line 802 is met, the qubit 3 happens to have been moved away from the LIZ (the LIZ being a high interaction zone, if a qubit is unused, this qubit will be likely have been moved away from the LIZ during earlier steps). Applying first the gate 814 phase 2 would therefore relatively increase the total distance of the partial schedule and phase 1 corresponding to 813 is applied instead, as illustrated in FIG. 14.

In some examples whereby, prior to the ordering, the method comprises proceeding with SWAP insertion on a source quantum circuit in order to obtain the nearest neighbor quantum circuit, the predefined constraint is also taken into account to proceed with SWAP insertion.

An example quantum computing compiling method 1100 which may be used for compiling a quantum circuit section on a quantum subsystem according to either one of, for example, blocks 13 or 15 of example method 10, is illustrated in FIG. 12. In this example, block 1001 comprises ordering quantum gates of a nearest neighbor quantum circuit section in function of dependencies between the quantum gates to obtain a quantum gates hierarchical order, the hierarchical order comprising a succession of front lines comprising multiple respective quantum gates of the nearest neighbor quantum circuit section. In this example, block 1002 comprises successively selecting, for each front line, and following the hierarchical order, a shuttling for each respective quantum gate of the front line. In this example, the shuttling selection is, for each front line, based on a predefined constraint.

Another example quantum computing compiling method 1100 which may be used for compiling a quantum circuit section on a quantum subsystem according to either one of, for example, blocks 13 or 15 of example method 10, is illustrated in FIG. 12. In this example, block 1101 comprises proceeding with SWAP insertion on a source quantum circuit section in order to obtain the nearest neighbor quantum circuit section prior to ordering, in block 1102, quantum gates of a nearest neighbor quantum circuit section in function of dependencies between the quantum gates to obtain a quantum gates hierarchical order, the hierarchical order comprising a succession of front lines comprising multiple respective quantum gates of the nearest neighbor quantum circuit section. In this example, block 1103 comprises successively selecting, for each front line, and following the hierarchical order, a shuttling for each respective quantum gate of the front line. In this example, the shuttling selection is, for each front line, based on a predefined constraint.

FIG. 13 illustrates an example computer system 1200 comprising a processor 1201, a memory 1202 and a networking module 1203, the processor 1201 being configured to operate according to any of the methods hereby described. Processor 1201 may comprise electronic circuits for computation managed by an operating system.

FIG. 13 also illustrates a non-transitory machine-readable or computer readable storage medium, such as, for example, memory or storage unit 1202, whereby the non-transitory machine-readable storage medium is encoded with instructions 1204 executable by a processor such as processor 1201, the machine-readable storage medium comprising instructions 1204 to operate processor 1201 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

In an example, the shuttling schedule illustrated in FIG. 14 is obtained by applying an example quantum computing compiling method which may be used for compiling a quantum circuit section on a quantum subsystem according to either one of, for example, blocks 13 or 15 of example method 10, this method applying to the quantum circuit section illustrated in FIG. 8 using the hierarchy illustrated in FIG. 9. The shuttling illustrated in FIG. 14 was compiled in 0.0075 seconds using a single thread of a Xeon E7 Intel processor. In this example, 5 different qubits are being used, the movement of each qubit being reproduced by a line running from the top to the bottom of the shuttling schedule, the line following the trajectory of the qubit. The line 1301 illustrates the trajectory of qubit q0, for example. The line 1302 illustrates the trajectory of qubit q1. The line 1303 illustrates the trajectory of qubit q2. In the first step 1311, qubit q0 and qubit q1 are moved together from their location to a neighbor location in the same direction represented on the right hand side. The other 3 qubits remain at their original location in the first step 1311. In the second step 1312, all 5 qubits are moved to a neighbor location in the same direction. At the end of the step 1312, qubit q0 is located in a specialized location 1399, in this case a LIZ. The locations are in FIG. 13 represented by vertical lines. In step 1313, all qubits except q0 are moved away from the LIZ, for example to provide sufficient room for further movements to take place later on. In the following step, q0 is submitted to a quantum gate in the LIZ, the quantum gate being represented by a black pentagon. The following steps are represented using the same conventions, the double triangle representing a SWAP quantum gate.

Figure 15:
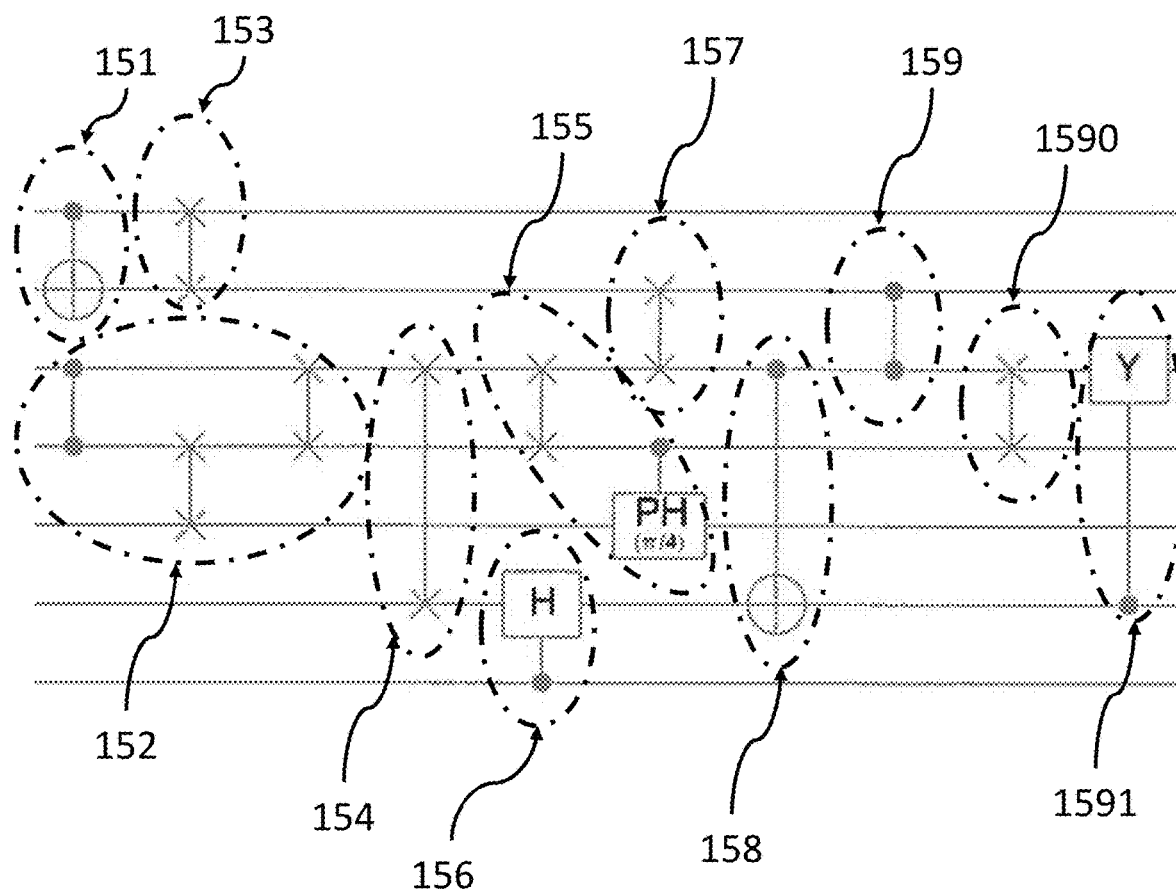
FIG. 15 is an example representation of a quantum circuit to which the disclosed method as per this disclosure may be applied.
Figure 16:
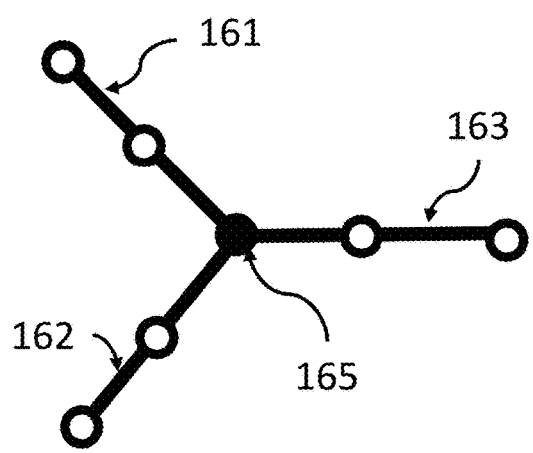
FIG. 16 illustrates an example of a plurality of interconnected qubit subsystems.

In an example, a quantum circuit illustrated in FIG. 15 is compiled on a plurality of interconnected subsystems illustrated in FIG. 16.

As illustrated in FIG. 15, executing the quantum circuit would involve 7 different qubits (the same number as the number of lines in FIG. 15). In this example, the quantum system illustrated in FIG. 16 comprises three different subsystems 161, 162 and 163. In this example, the subsystems are connected to a same junction 165. Each subsystem comprises three qubit locations illustrated by circles, each subsystem comprising one qubit location at the junction 165, and two other locations which are not comprised in the junction 165.

Figure 17:
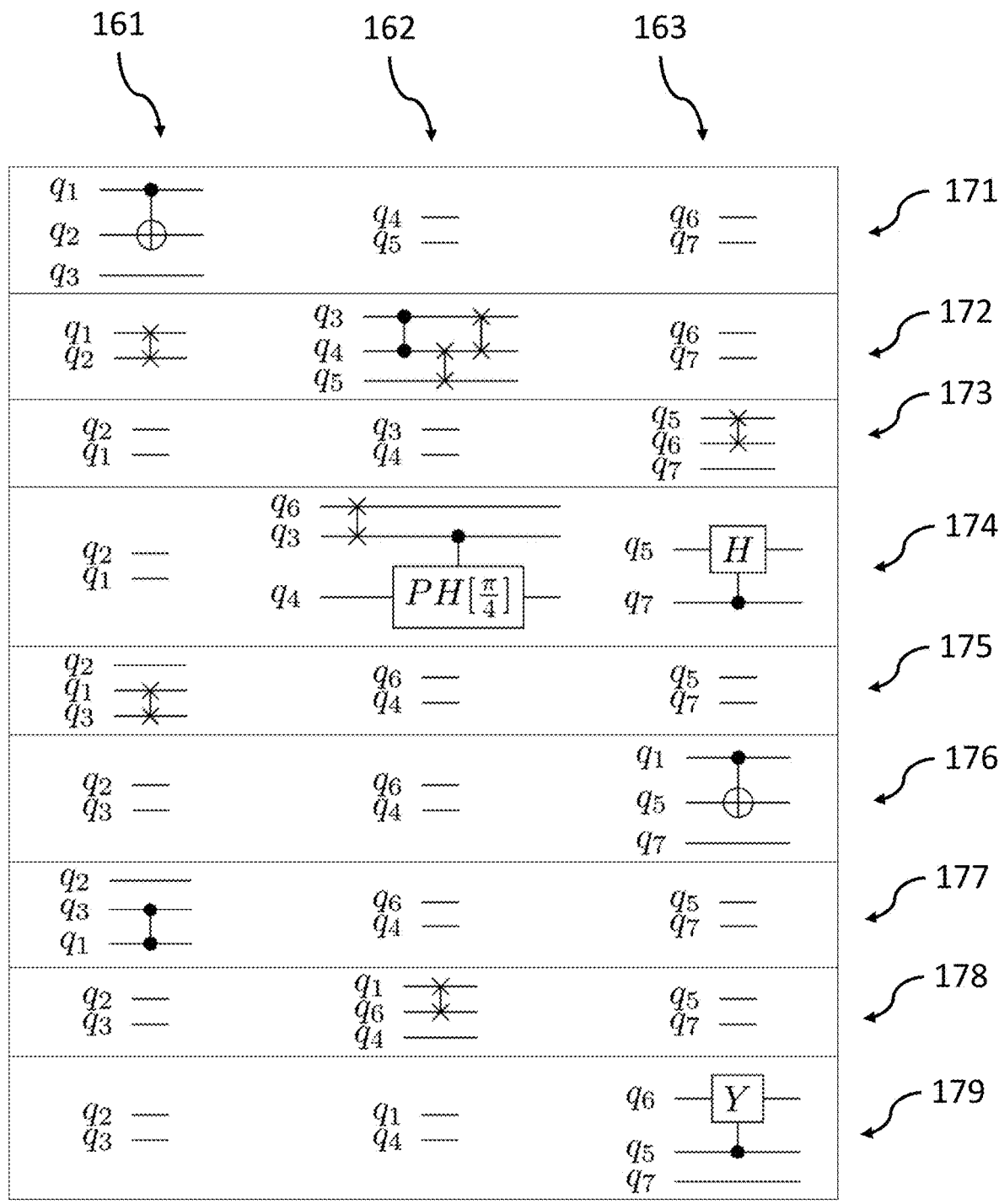
FIG. 17 illustrates an example of compilation of different sections.

FIG. 17 illustrates a compiling of the quantum circuit illustrated in FIG. 15 using the plurality of interconnected subsystems illustrated in FIG. 16 according to an example method.

As illustrated in FIG. 16, the threshold corresponding to a maximum number of qubits available for processing in any one subsystems 161, 162 or 163 is 3, which is the maximum number of cubits available for processing in any one of the subsystems considered. On the other hand, the total number of qubits submitted to the specific quantum circuit illustrated in FIG. 15 is 7. In this example, as in other examples of methods according to this disclosure, one may check that the total number of qubits submitted to the specific quantum circuit, in this case 7, exceeds the threshold, in this case 3. One may also check that the total number of qubits available for processing in the plurality of subsystems is equal to or higher than the total number of qubits submitted to the specific quantum circuit.

A first section 151 of the quantum circuit of FIG. 15 is compiled on the first subsystem 161 as illustrated in FIG. 17, in phase 171. Phase 171 illustrates that section 151 is compiled using qubits q1, q2 and q3 of subsystem 161. Qubit q3 is present in subsystem 161 during this phase 171. This qubit q3 is in the location of subsystem 161 comprised in junction 165.

The compiling of section 151 is followed in this example by coding the passing of qubit q3 from subsystem 161 through junction 165 to subsystem 162 in order to compile a second section 152 of the quantum circuit of FIG. 15.

Second section 152 of the quantum circuit of FIG. 15 is compiled on the second subsystem 162 as illustrated in FIG. 17, in phase 172. Phase 172 illustrates that section 152 is compiled using qubits q3, q4 and q5 of subsystem 162, q3 having passed from subsystem 161 to subsystem 162 through junction 165. One should note that in this case, if qubit q3 had been originally located in system 162, such passing of q3 would not have had to take place.

During phase 172, section 153 of the quantum circuit illustrated in FIG. 15 is compiled on subsystem 161 in parallel as section 152 is compiled on subsystem 162.

A section 154 of the quantum circuit of FIG. 15 is compiled on the third subsystem 163 as illustrated in FIG. 17, in phase 173. In this case, the quantum gate applied in section 154 is to be applied to qubits q5 and q6 which were in different subsystems, namely 162 for q5 (see phase 172) and 163 for q6. When passing from phase 172 to 173, qubit q5 was coded as passing in junction 165 from subsystem 162 to subsystem 163 in order to compile the quantum gate of section 154 (which is a SWAP quantum gate in this case). The coding of passing of q5 from subsystem 162 to subsystem 163 through junction 165 is due to the selected SWAP quantum gate of section 154 being applied to qubits assigned to different subsystems 162 and 163.

From phase 173 to phase 174 as illustrated in FIG. 17, qubit q6 is coded to pass from subsystem 163 to subsystem 162 through junction 165 in order to compile the SWAP gate between q5 and q6 comprised in quantum circuit section 155 of FIG. 15. The coding of passing of q6 from subsystem 163 to subsystem 162 through junction 165 is due to the selected SWAP quantum gate of section 155 being applied to qubits assigned to different subsystems 162 and 163.

In phase 174, various quantum gates pertaining to both quantum circuit sections 155 and 156 of FIG. 15 are compiled on, respectively, subsystems 162 and 163.

From phase 174 to phase 175 as illustrated in FIG. 17, qubit q3 is coded to pass from subsystem 162 to subsystem 161 through junction 165 in order to compile the SWAP gate between q1 and q3 comprised in quantum circuit section 157 of FIG. 15. The coding of passing of q3 from subsystem 162 to subsystem 161 through junction 165 is due to the selected SWAP quantum gate of section 157 being applied to qubits assigned to different subsystems 161 and 162. In phase 175, the SWAP quantum gate as per quantum circuit section 157 between q1 and q3 is compiled on subsystem 161.

From phase 175 to phase 176 as illustrated in FIG. 17, qubit q1 is coded to pass from subsystem 161 to subsystem 163 through junction 165 in order to compile the quantum gate between q1 and q5 comprised in quantum circuit section 158 of FIG. 15. The coding of passing of q1 from subsystem 161 to subsystem 163 through junction 165 is due to the selected quantum gate of section 158 being applied to qubits assigned to different subsystems 161 and 163. In phase 176, the quantum gate between q1 and q5 as per quantum circuit section 158 is compiled on subsystem 163.

From phase 176 to phase 177 as illustrated in FIG. 17, qubit q1 is coded to pass from subsystem 163 to subsystem 161 through junction 165 in order to compile the quantum gate between q3 and q1 comprised in quantum circuit section 159 of FIG. 15. The coding of passing of q1 from subsystem 163 to subsystem 161 through junction 165 is due to the selected quantum gate of section 159 being applied to qubits assigned to different subsystems 161 and 163. In phase 177, the quantum gate between q1 and q3 as per quantum circuit section 159 is compiled on subsystem 161.

From phase 177 to phase 178 as illustrated in FIG. 17, qubit q1 is coded to pass from subsystem 161 to subsystem 162 through junction 165 in order to compile the quantum gate between q1 and q6 comprised in quantum circuit section 1590 of FIG. 15. The coding of passing of q1 from subsystem 161 to subsystem 162 through junction 165 is due to the selected quantum gate of section 1590 being applied to qubits assigned to different subsystems 161 and 162. In phase 178, the SWAP quantum gate between q1 and q6 as per quantum circuit section 1590 is compiled on subsystem 162.

From phase 178 to phase 179 as illustrated in FIG. 17, qubit q6 is coded to pass from subsystem 162 to subsystem 163 through junction 165 in order to compile the quantum gate between q6 and q5 comprised in quantum circuit section 1591 of FIG. 15. The coding of passing of q6 from subsystem 162 to subsystem 163 through junction 165 is due to the selected quantum gate of section 1591 being applied to qubits assigned to different subsystems 162 and 163. In phase 179, the quantum gate between q5 and q6 as per quantum circuit section 1591 is compiled on subsystem 163. This phase 179 completes the compiling of the specific quantum circuit illustrated in FIG. 15 according to an example method.

The invention claimed is:

1. A method for compiling a quantum circuit on a plurality of qubit subsystems interconnected by one or more junctions therebetween, comprising:
   identifying a total number of qubits submitted to a specific quantum circuit, whereby the total number of qubits exceeds a defined threshold, the threshold being a maximum number of qubits available for processing in any one qubit subsystem of a plurality of interconnected qubit subsystems;
   compiling a first section of the specific quantum circuit on a first qubit subsystem of the plurality of qubit subsystems by successively selecting quantum gates from the specific quantum circuit;
   wherein if a selected quantum gate is to be applied to qubits assigned to different qubit subsystems, coding the passing of a qubit from the first qubit subsystem to a second qubit subsystem of the plurality of qubit subsystems through a junction connecting the first qubit subsystem to the second qubit subsystem; and
   compiling a second section of the specific quantum circuit on the second qubit subsystem.

2. The method according to claim 1, further comprising:
   prior to identifying the total number of qubits submitted to the quantum circuit, proceeding with SWAP insertion on a source quantum circuit in order to obtain the specific quantum circuit.

3. The method according to claim 1, further comprising:
   compiling one or more additional sections of the specific quantum circuit on one or more additional subsystems of the plurality of qubit subsystems, the one or more additional subsystems being connected to the first qubit subsystem directly or indirectly.

4. The method according to claim 3,
   whereby the one or more additional subsystems are connected to the first qubit subsystem directly or indirectly through one or more additional junctions; and
   whereby the method further comprises coding the passing of a qubit through the one or more additional junctions in order to compile the one or more additional sections.

5. The method according to claim 1, whereby each subsystem comprises locations, whereby each location is configured to permit:
   swapping qubits if the location holds two qubits; and
   moving all qubits present at the location to a neighbor empty location.

6. The method according to claim 1, whereby each subsystem of the plurality of qubit subsystems comprises a specialized location, whereby: two single qubits may be joined into the specialized location from neighboring locations if the specialized location is empty; qubits may be split from the specialized location towards neighboring empty locations; and qubits located at the specialized location may all be submitted to a quantum gate.

7. The method according to claim 6, whereby the specialized location is a laser interaction zone.

8. The method according to claim 6, whereby the specialized location comprises 2 qubits, and whereby the 2 qubits are submitted to more than one quantum gate successively at the specialized location.

9. The method according to claim 1, whereby each subsystem comprises locations, whereby each location may either be empty, comprise one qubit, or comprise 2 qubits.

10. The method according to claim 1, whereby each junction between N subsystems comprises N locations, whereby each subsystem of the N subsystems comprises one of the N locations, whereby N is a natural integer greater than 1.

11. The method according to claim 10, whereby each one of the N locations has a single neighbor location on a same subsystem.

12. The method according to claim 1, whereby coding the passing of a qubit through a junction comprises coding the passing of the qubit from a source location of the junction on a source subsystem to a destination location on a destination subsystem, whereby the destination location is empty prior to passing the qubit, and whereby the source and destination subsystems are each one of the plurality of interconnected qubit subsystems.

13. The method according to claim 1, further comprising:
   coding a parallel processing of different sections on different subsystems of the plurality of interconnected qubit subsystems prior to the passing of a qubit through a junction.

14. The method according to claim 1, further comprising:
   prior to identifying the total number of qubits submitted to the quantum circuit, proceeding with SWAP insertion on a source quantum circuit in order to obtain the specific quantum circuit; and
   whereby coding the passing of a qubit through a junction comprises coding the passing of the qubit from a source location of the junction comprised on a source subsystem to a destination location on a destination subsystem, whereby the destination location is empty prior to passing the qubit, and whereby the source and destination subsystems are comprised in the plurality of interconnected qubit subsystems.

15. A computer system comprising a processor and a non-transitory computer-readable storage computer unit, the computer system configured to compile a quantum circuit on a plurality of qubit subsystems interconnected by one or more junctions therebetween, the storage unit comprising instructions to:
   identify a total number of qubits submitted to a specific quantum circuit, whereby the total number of qubits exceeds a defined threshold, the threshold being a maximum number of qubits available for processing in any one subsystem of a plurality of interconnected qubit subsystems;
   compile a first section of the specific quantum circuit on a first qubit subsystem of the plurality of interconnected qubit subsystems by successively selecting quantum gates from the specific quantum circuit;
   wherein if a selected quantum gate is to be applied to qubits assigned to different qubit subsystems, code the passing of a qubit from the first qubit subsystem to a second qubit subsystem of the plurality of interconnected qubit subsystems through a junction connecting the first qubit subsystem to the second qubit subsystem; and
   compile a second section of the specific quantum circuit on the second qubit subsystem.

16. The computer system according to claim 15, the storage unit further comprising: instructions to, prior to identifying the total number of qubits submitted to the specific quantum circuit, proceeding with SWAP insertion on a source quantum circuit in order to obtain the specific quantum circuit.

17. The computer system according to claim 15, whereby the instructions to code the passing of a qubit through a junction comprises instructions to code the passing of the qubit from a source location of the junction comprised on a source subsystem to a destination location on a destination subsystem, whereby the destination location is empty prior to passing the qubit, and whereby the source and destination subsystems are each one of the plurality of interconnected qubit subsystems.

18. A non-transitory computer-readable storage medium comprising instructions executable by a processor for compiling a quantum circuit on a plurality of qubit subsystems interconnected by one or more junctions therebetween, the computer-readable storage medium comprising:
  instructions to identify a total number of qubits submitted to a specific quantum circuit, whereby the total number of qubits exceeds a threshold, the threshold being a maximum number of qubits available for processing in any one subsystem of a plurality of interconnected qubit subsystems;
  instructions to compile a first section of the specific quantum circuit on a first qubit subsystem of the plurality of interconnected qubit subsystems by successively selecting quantum gates from the specific quantum circuit;
  instructions to, if a selected quantum gate is to be applied to qubits assigned to different qubit subsystems, code the passing of a qubit from the first qubit subsystem to a second qubit subsystem of the plurality of interconnected qubit subsystems through a junction connecting the first qubit subsystem to the second qubit subsystem; and
  instructions to compile a second section of the specific quantum circuit on the second qubit subsystem.

19. The non-transitory computer-readable storage medium according to claim 18, the computer-readable storage medium comprising further comprising:
  instructions to, prior to identifying the total number of qubits submitted to a specific quantum circuit, proceeding with SWAP insertion on a source quantum circuit in order to obtain the specific quantum circuit.

20. The non-transitory computer-readable storage medium according to claim 18, whereby the instructions to code the passing of a qubit through a junction comprises instructions to code the passing of the qubit from a source location of the junction comprised on a source subsystem to a destination location on a destination subsystem, whereby the destination location is empty prior to passing the qubit, and whereby the source and destination subsystems are each one of the plurality of interconnected qubit subsystems.

* * * * *